US008612194B2

(12) United States Patent
Horne et al.

(10) Patent No.: US 8,612,194 B2
(45) Date of Patent: Dec. 17, 2013

(54) UPDATING A SUBTERRANEAN MODEL USING AT LEAST ELECTROMAGNETIC DATA

(75) Inventors: Steve Horne, Lafayette, CA (US); David Alumbaugh, Berkeley, CA (US)

(73) Assignee: WesternGeco L.L.C., Houston, TX (US)

(*) Notice: Subject to any disclaimer, the term of this patent is extended or adjusted under 35 U.S.C. 154(b) by 1096 days.

(21) Appl. No.: 11/835,466

(22) Filed: Aug. 8, 2007

(65) Prior Publication Data

US 2009/0043554 A1    Feb. 12, 2009

(51) Int. Cl.
| | |
|---|---|
| G06G 7/48 | (2006.01) |
| G01V 1/40 | (2006.01) |
| G01V 3/18 | (2006.01) |
| G01V 5/04 | (2006.01) |
| G01V 9/00 | (2006.01) |

(52) U.S. Cl.
USPC ................................................ 703/10; 702/7

(58) Field of Classification Search
USPC ................................................ 703/10; 702/7
See application file for complete search history.

(56) References Cited

U.S. PATENT DOCUMENTS

| | | | | |
|---|---|---|---|---|
| 4,969,130 | A * | 11/1990 | Wason et al. | 367/73 |
| 5,870,690 | A * | 2/1999 | Frenkel et al. | 702/7 |
| 6,914,433 | B2 | 7/2005 | Wright et al. | |
| 6,980,940 | B1 * | 12/2005 | Gurpinar et al. | 703/10 |
| 7,191,063 | B2 * | 3/2007 | Tompkins | 702/2 |
| 8,126,650 | B2 * | 2/2012 | Lu et al. | 702/11 |
| 2002/0088618 | A1 | 7/2002 | Ramakrishnan et al. | |
| 2005/0237063 | A1 | 10/2005 | Wright et al. | |
| 2006/0038570 | A1 | 2/2006 | Constable | |
| 2007/0255499 | A1 * | 11/2007 | Strack et al. | 702/11 |
| 2007/0255500 | A1 * | 11/2007 | Pita et al. | 702/11 |
| 2007/0285274 | A1 * | 12/2007 | Esmersoy | 340/853.5 |
| 2008/0015782 | A1 * | 1/2008 | Saltzer et al. | 702/12 |
| 2008/0071709 | A1 * | 3/2008 | Strack | 706/20 |

FOREIGN PATENT DOCUMENTS

| | | |
|---|---|---|
| EP | 1 613 982 | 1/2007 |
| GB | 2 413 188 | 10/2005 |
| WO | 0162603 A2 | 8/2001 |
| WO | WO 2005/085909 | 9/2005 |

OTHER PUBLICATIONS

Frederick D. Day-Lewis, "Applying petrophysical models to radar travel time and electrical resistivity tomograms: Resolution-dependent limitations", Journal of Geophysical Research, vol. 110, B08206, doi:10.1029/2004JB003569, 2005.*

Christine Ecker, Jack Dvorkin, and Amos M. Nur, "Estimating the amount of gas hydrate and free gas from marine seismic data", Geophysics, vol. 65, No. 2 (Mar.-Apr. 2000); p. 565-573.*

Stephen Moysey, Rosemary Knight, Kamini Singha, "Relating Geophysical and Hydrologic Properties Using Field-Scale Rock Physics", Mar. 2006.*

(Continued)

Primary Examiner — Omar Fernandez Rivas
Assistant Examiner — Angel Calle

(57) ABSTRACT

To update a subterranean model, an initial subterranean model is provided, and based on the initial subterranean model, changes to subterranean parameters are predicted using a reservoir simulator. Electromagnetic data representing characteristics of a subterranean structure is computed according to the predicted changes to the subterranean parameters, and the initial subterranean model is modified based on comparing the computed electromagnetic data with observed electromagnetic data.

21 Claims, 3 Drawing Sheets

(56) References Cited

OTHER PUBLICATIONS

Carlos Torres-Verdin, Mrinal K. Sen, "Integrated Approach for the Petrophysical Interpretation of Post-and Pre-Stack 3-D Seismic Data, Well-Log Data, Core Data, Geological Information and Reservoir Production Data Via Bayesian Stochastic Inversion", Third Annual Report for the Period Sep. 30, 2002 to Aug. 30, 2003, Mar. 2004.*

Yoram Rubin, G. Michael Hoversten, Zhangshuan Hou and Jinsong Chen, "Risk Reduction in Gas Reservoir Exploration Using Joint Seismic-EM Inversion", Winter of 2006, Gas Exploration.*

Yoman Rubin, "Risk Reduction in Gas Reservoir Exploration Using Joint Seismic-EM Inversion", Winter 2006.*

Stephen Moysey, "Relating geophysical and Hydrologic properties using field-scale rock physics", Mar. 2006.*

Fanchi, "Time-lapse seismic monitoring in reservoir management," *The Leading Edge*, 20(10):1140-1147, 2001.

Wilt and Morea, "3D waterflood monitoring at Lost Hills with crosshole EM," *The Leading Edge*, 23(5):489-493, 2004.

Landro, Future Challenges and Unexplored Methods for 4D Seismic Analysis, CSEG Recorder, 2006, pp. 128-134.

Zou, et al., Integration of Seismic Methods with Reservoir Simulation, Pikes Peak Heavy-Oil Field, Saskatchewan, The Leading Edge, Jun. 2006, pp. 764-781.

PCT Search Report, dated Feb. 4, 2010, Application No. PCT/US2008/068057.

\* cited by examiner

UPDATING A SUBTERRANEAN MODEL USING AT LEAST ELECTROMAGNETIC DATA

TECHNICAL FIELD

The invention relates to updating subterranean models that represent the characteristics of a reservoir, where the updates are provided using electromagnetic data with/or without seismic data.

BACKGROUND

Seismic surveying is used for identifying subterranean geological structures, such as hydrocarbon layers, fresh water aquifers, and so forth. In performing seismic surveying, seismic sources are placed at various locations on an earth surface or sea floor (or in a wellbore), with the seismic sources activated to generate seismic waves directed into a subterranean structure. Examples of seismic sources include explosives, air guns, or other sources that generate seismic (acoustic) waves. In a marine environment, seismic sources and sensors can be towed in water by a sea vessel.

The seismic waves generated by a seismic source travel into the subterranean structure, with a portion of the seismic waves reflected back to the surface (earth surface, sea floor, or wellbore surface) where they may be detected by seismic sensors (e.g., geophones). These seismic sensors produce signals that represent detected seismic waves. Signals from the seismic sensors are processed to yield information about the content and characteristic of the subterranean structure.

Time-lapse seismic surveying involves the use of two or more seismic surveys acquired at different times to measure production-related or other development effects on a subterranean structure, such as a reservoir production. Conventional techniques for time-lapse seismics typically monitor fluid and other property changes which may occur during development (e.g., fluid extraction) of the subterranean structure. However, time-lapse seismic surveying does not provide a complete picture of changes that may occur in the subterranean structure due to development. Therefore, a model of the subterranean structure based on conventional time-lapse seismic surveying techniques may not be accurate or complete.

SUMMARY

One aspect of the invention relates to a method of updating a subterranean model that provides an initial subterranean model, and based on the initial subterranean model, predicting changes to subterranean parameters using a reservoir simulator. Electromagnetic data representing characteristics of a subterranean structure are computed according to the predicted changes to the subterranean parameters. The initial subterranean model is then modified to provide an updated subterranean model based on comparing the computed electromagnetic data with observed electromagnetic data such that there is a better agreement between the two data.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1A:
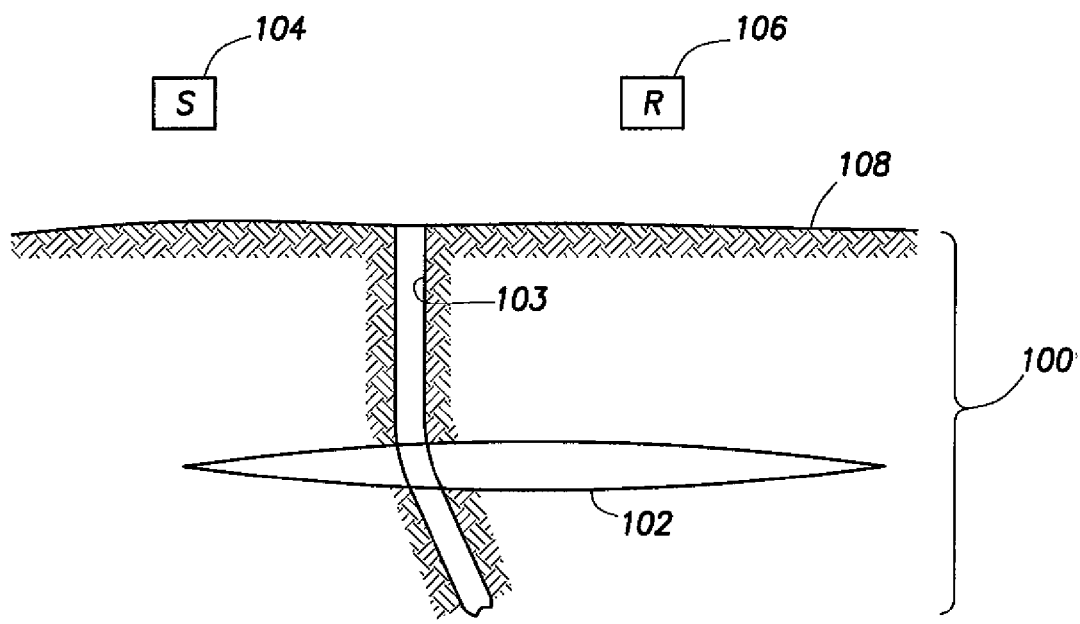
FIGS. 1A-1B illustrate two example arrangements in which time-lapse surveying may be performed.

Time-lapse seismic and/or electromagnetic (EM) measurements may be made for the purpose of updating a subterranean model that represents a subterranean structure. FIG. 1A illustrates an example subterranean structure 100 that includes a target body 102 of interest. The target body 102 can include a reservoir, such as a hydrocarbon-bearing reservoir, a gas injection zone, a thin carbonate or salt layer, a freshwater aquifer, and so forth. The subterranean structure 100 typically includes multiple layers that can have varying characteristics, such as varying densities, velocity fields, resistivities, and so forth. As further depicted in FIG. 1A, a well 103 has been drilled into the subterranean structure 100. The well 103 extends through the target body 102 so that either production or injection can be performed with respect to the target body 102.

To characterize the subterranean structure 100, a surveying technique that uses one or more sources 104 and one or more receivers 106 may be employed. The one or more sources 104 can include seismic and/or electromagnetic (EM) sources, and the one or more receivers 106 can include seismic and/or EM receivers. The sources 104 and 106 can be placed at the surface 108, which can be a land surface, sea floor or some other location, such as a wellbore. Similarly, receivers (106) can be placed at the surface 108, which can be a land surface, sea floor or some other location, such as a wellbore. In a marine environment, the source 104 and receiver 106 can be towed by a sea vessel, or alternatively, the source 104 is towed by the sea vessel while the receiver 106 is placed on the surface 108. In a land environment, both the source 104 and receiver 106 would typically be placed on the surface 108. In other examples, EM sources and receivers may be airborne. Seismic and/or EM signals generated by the source 104 interact with the subterranean structure 100, and the fields scattered from or otherwise affected by the subterranean structure (such as from the target body 102) are received by the receiver 106.

One type of EM surveying is controlled source EM (CSEM) surveying, in which an EM source controlled by a surface controller is used to inject/induce EM fields into the subterranean structure being analyzed. Another form of EM surveying is magnetotelluric (MT) surveying, which employs time measurements of naturally occurring electric and magnetic fields for determining the electrical conductivity distribution beneath the surface.

In seismic surveying, the source 104 can be a source that generates an acoustic wave that is propagated into the subterranean structure. Examples of seismic sources include explosives, air guns, and so forth. Examples of a seismic receiver 106 include geophones and hydrophones.

Figure 1B:
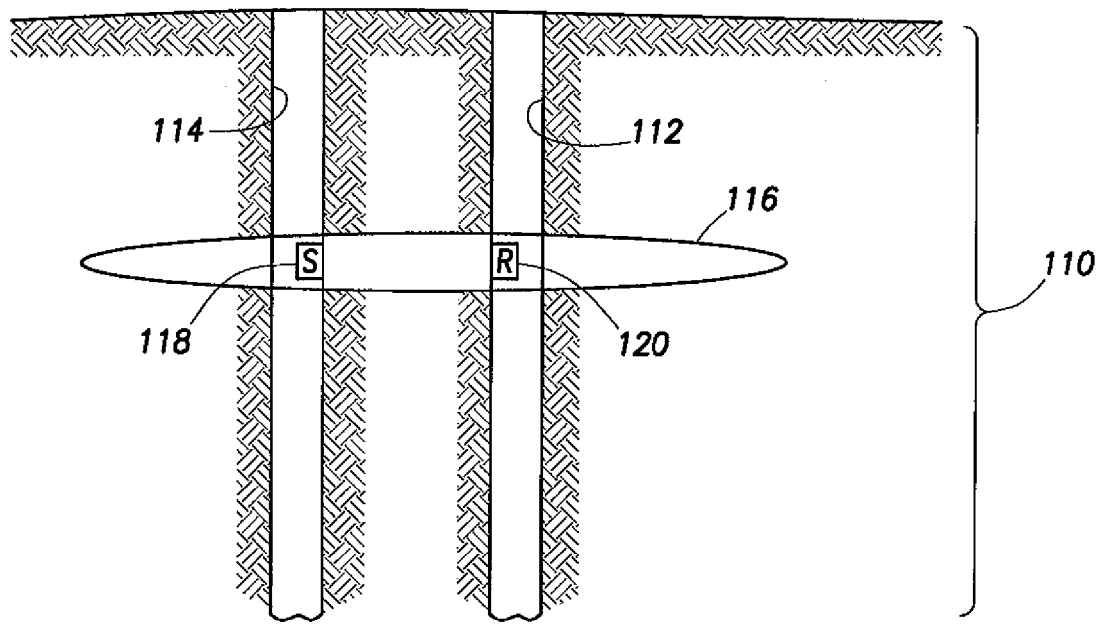

FIG. 1B shows an alternative form of EM surveying with/or without seismic surveying, which involves cross-well measurements. As depicted in FIG. 1B, two wells 112, 114 are drilled into a subterranean structure 110. Both wells 112, 114, or at least one of the wells, extend through a target body 116 that is to be developed (e.g., produce fluids or inject fluids). An EM and/or seismic source (or multiple sources) 118 is (are) placed in one of the wells 114, and an EM and/or seismic receiver (or multiple receivers) 120 is (are) placed in the other well 112. The source 118 is then activated, with the receiver 120 receiving EM or seismic data that has been modified by travel through the subterranean structure 110 between the wells 112, 114. Note that these surveys need not be carried out at the same time.

Based on surveying performed generally as discussed above, a subterranean model can be developed. The term "subterranean model" refers to a model of characteristics of at least a portion of the subterranean structure 100, 110. The subterranean model can be just a reservoir model that represents characteristics of the reservoir (target body 102, 116). Alternatively, the subterranean model can represent characteristics of the reservoir as well as characteristics outside the reservoir. In the latter case, the subterranean model can represent geomechanical effects for regions of the subterranean structure 100, 110 outside the reservoir, where the geomechanical effects can represent changes (e.g., subsidence) of the surrounding regions due to production from or injection into the reservoir.

With development (fluid production or injection) of the target body 102 or 116, various fluid and property changes may occur in the subterranean structure 100 or 110. Examples of fluid production from a reservoir include production of hydrocarbons or fresh water. An example of fluid injection includes injection of waste carbon dioxide (or other gas) for purposes of sequestration. Deep saline water reservoirs can be used for storing waste carbon dioxide gas since such deep saline water reservoirs have a relatively large storage volume to store the waste carbon dioxide. As a result of replacing conductive brine solutions with non-conductive carbon dioxide gas, properties (such as electrical properties including resistivity) of the subterranean structure 100, 110 including the target body 102, 116 may change.

As the characteristics of the subterranean structure 100, 110 change due to development of the target body 102, 116, it is desirable to update a subterranean model representing the subterranean structure 100, 110 due to effects of the development. In some examples, updating the subterranean model can be based on performing time-lapse EM surveying. Time-lapse EM surveying refers to performing EM surveys at different times to monitor effects of development of the target body 102, 116 and the subterranean structure 100.

In some examples, updating of the subterranean model can be based on just time-lapse EM surveying. In other examples, updating of the subterranean model can be based on both time-lapse EM surveying and time-lapse seismic surveying. The benefit of using EM data in performing time-lapse surveying is that additional (or different) information, such as changes in electrical properties (e.g., resistivity), is provided with EM data which may not be available with accuracy from seismic data alone.

Time-lapse surveying using seismic data can detect changes in elastic properties, such as P-wave velocities, S-wave velocities, and densities. P-waves and S-waves are two types of seismic waves that can propagate through a subterranean structure. A P-wave (also referred to as a compressional wave) is generally polarized in the direction of propagation of the seismic wave, and an S-wave (also referred to as a shear wave) is polarized in a direction generally perpendicular to the direction of propagation of the seismic wave. Note that in a subterranean structure, there are various structures with differing densities and P- and S-wave velocities.

In some examples, observed EM data and observed seismic data are received, where the observed EM data and observed seismic data are collected based on respective EM and seismic time-lapse surveys. The observed EM data and observed seismic data are compared to synthetic EM data and synthetic seismic data, respectively, where synthetic EM data and synthetic seismic data refer to EM and seismic data generated by results derived from a reservoir simulator based on an existing subterranean model. In some examples, by comparing the synthetic data with the observed data, an analysis system is able to determine what changes should be made to the existing subterranean model. Based on the comparison, an updated subterranean model can then be generated to replace the current subterranean model.

Note that updating the subterranean model can be based on comparing both observed EM data and observed seismic data with synthetic EM data and synthetic seismic data, or alternatively, based on comparing just the observed EM data with synthetic EM data. Also, the analysis system may also compare an observed production history of a well with a modeled production profile generated by the reservoir simulator when determining what changes should be made to the existing subterranean model. Other measurement data can also be considered in making changes to the subterranean model. For example, logging measurements (e.g., wireline logging measurements) can also be considered to determine the effect of reservoir development on a subterranean model.

Figure 2:
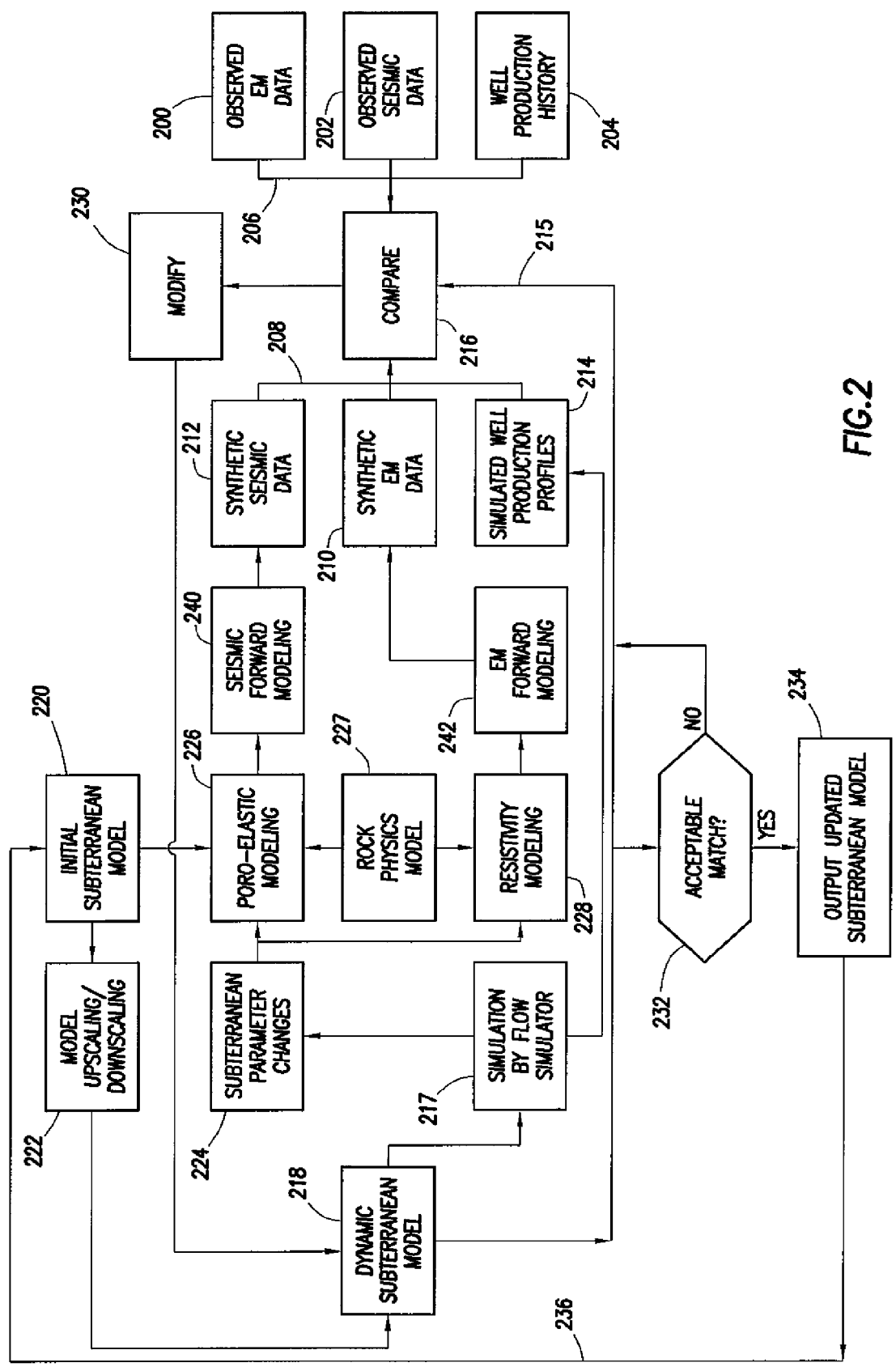
FIG. 2 is a flow chart that depicts an example of a general flow to enable the updating of a subterranean model based on both electromagnetic (EM) data and seismic data.

FIG. 2 shows an example of a flow of a process for updating a subterranean model. The process depicted in FIG. 2 is performed by an analysis system, which may be implemented with a computer running analysis software (depicted in FIG. 3).

An initial subterranean model 220 and various observed data (including observed EM data 200, observed seismic data 202, and a well production history 204) are provided. The well production history contains a history of collected data such as temperature and pressure profiles. To simulate (217) changes to subterranean parameters due to fluid flow to or from a reservoir (such as fluid flow in wells 103, 112, 114 of FIGS. 1A-1B), a reservoir simulator (such as a flow simulator) is provided. Synthetic data 210, 212, and 214 are generated based on outputs produced by the reservoir simulation (217) performed by the reservoir simulator, where the simulation is according to the model. The synthetic data (210, 212, 214) are compared (216) to the observed data (200, 202, 204) for the purpose of iteratively updating the model until an acceptable model is produced. The tasks along the loop 215 of FIG. 2, as well as the tasks within the loop 215, are repeated until a model that provides an acceptable match between the synthetic data and the observed data is found at 232.

As further depicted in FIG. 2, in the process flow, the observed EM data 200, observed seismic data 202, and well production history 204 are received (at 206). Although not shown, logging measurement data can also be received at 206. The analysis system further receives (at 208) the synthetic EM data 210, synthetic seismic data 212, and modeled production profiles (e.g., temperature profiles and pressure profiles) 214. Optionally, the analysis system can also receive synthetic logging measurement data. The synthetic data are compared to the observed data (at 216) by the analysis system. The analysis system attempts to minimize any mismatch between the observed and synthetic seismic data, EM data, and production profiles (and optionally logging measurement data) by determining what updates should be made to an existing subterranean model (depicted as initial subterranean model 220 in FIG. 2).

The synthetic data 210, 212, and 214 are generated based on outputs produced by the reservoir simulation (217) performed by the flow simulator. The flow simulator receives as input a dynamic subterranean model (218) and performs simulation (217) of fluid flow to or from the reservoir (such as fluid flow in wells 103, 112, 114 of FIGS. 1A-1B). The dynamic subterranean model 218 is generated from the initial subterranean model 220 by performing model upscaling or downscaling (222). Model upscaling or downscaling is performed because the reservoir represented by the initial subterranean model 220 may have different dimensions from the actual reservoir for which observed data (200, 202, 204) have been received. Therefore, to account for such differences in dimensions, model upscaling or downscaling is performed (222) to provide the dynamic subterranean model 218 having reservoir dimensions that match the actual reservoir.

The reservoir simulation (217) performed by the flow simulator produces subterranean parameter changes (224) resulting from development (e.g., fluid production or injection) of the reservoir. Parameter changes include changes in pressure, changes in saturation due to extraction or injection of fluids from or into the reservoir, and changes in other parameters. The parameters changes (224) are converted using poro-elastic rock physics modeling (226) to elastic properties and then to synthetic seismic data 212 using seismic forward modeling (240). The parameter changes (224) are also converted by resistivity rock physics modeling (228) to resistivity properties and then to synthetic EM data by EM forward modeling (242). The poro-elastic rock physics modeling and resistivity rock physics modeling are based on appropriate rock physics models 227. An example type of poro-elastic modeling that can be used is Gassmann modeling, which estimates the change in bulk modulus of saturated rock when the original fluid is replaced by a fluid with a different modulus. Subsequent seismic modeling can then be applied to the predicted changes in elasticity to predict changes in seismic data. Such seismic forward modeling could be by ray tracing or by finite difference techniques.

An example of resistivity modeling is modeling based on Archie's law that relates electrical conductivity of rock to its porosity and brine saturation. Together, the poro-elastic modeling and resistivity modeling allow for conversion between reservoir parameter changes due to development of a reservoir to the synthetic EM and seismic data via appropriate forward modeling methods 240, 242.

As further depicted by FIG. 2, the reservoir simulation 217 also produces production profiles 214 (e.g., temperature and/or pressure profiles along a well) based on the dynamic subterranean model 218.

As a result of the comparing (216), and based on minimizing mismatches between observed and synthetic seismic, EM, and production data, the analysis system modifies (at 230) the subterranean model to update the dynamic subterranean model 218. The modified (updated) subterranean model is then used to further produce synthetic seismic, EM, and production data 212, 210, and 214 according to tasks 216, 224, 226, 228, 240, and 242. The analysis system determines (at 232) whether there is an acceptable match between the synthetic data (produced using the updated dynamic reservoir model 218) and observed data. If not, the process depicted in FIG. 2 is repeated until an acceptable match is determined at 232, where "acceptable match" refers to differences between the synthetic and observed seismic, EM data, and/or production data within predefined thresholds. If there is an acceptable match between the observed and synthetic data, as determined at 232, then the updated subterranean model is output (at 234). The output subterranean model is used to replace (at 236) the initial subterranean model (220) for further iterations of the process of FIG. 2 in response to further development of the reservoir at a later time.

The above refers to providing an initial subterranean model and updating the subterranean model based on the described tasks. In other implementations, the tasks can be performed with respect to a group of subterranean models, instead of just one model.

Figure 3:
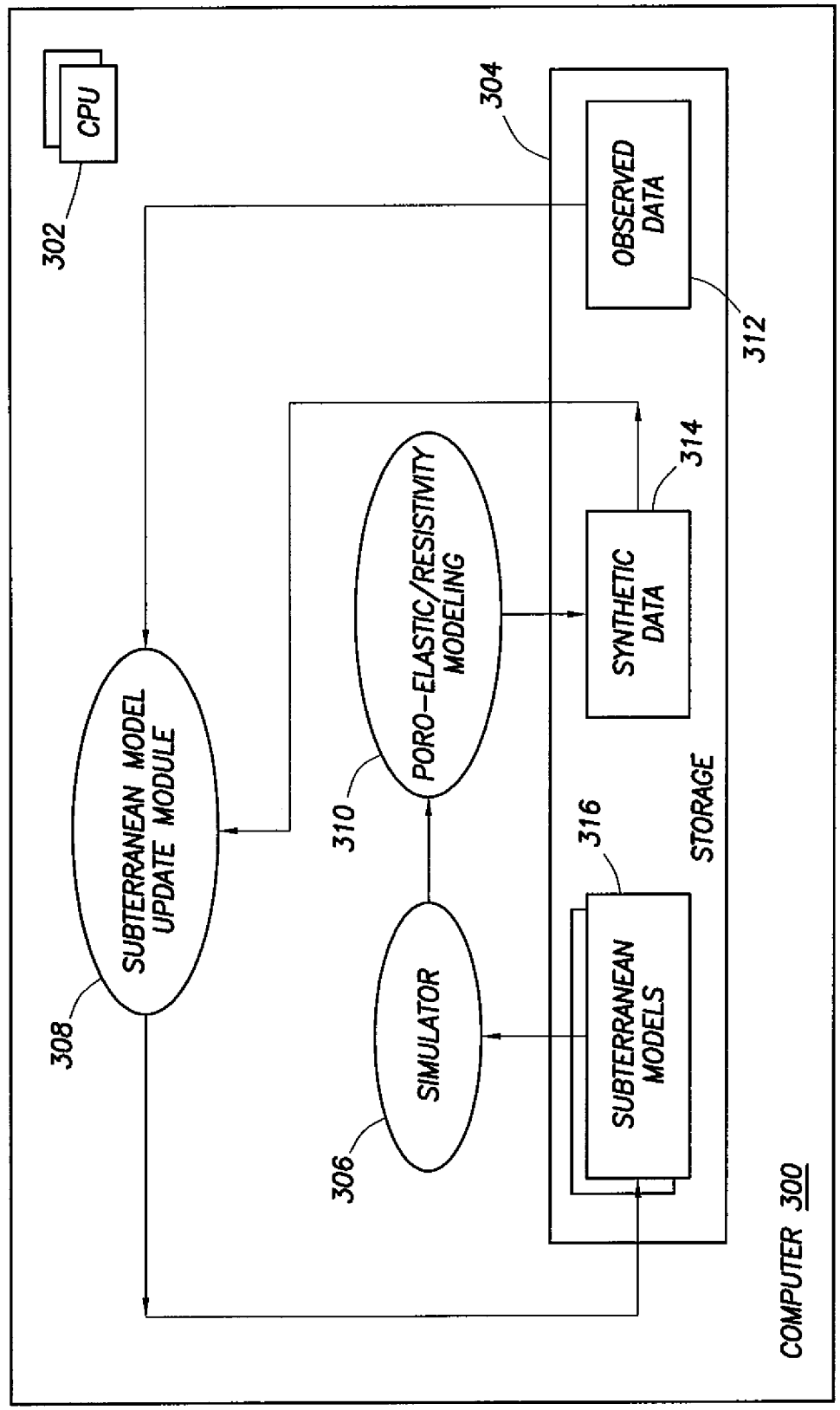
FIG. 3 is a block diagram of an example computer in which a process for time-lapse surveying is executable.

FIG. 3 shows an example arrangement of a computer 300 in which a process according to an embodiment is executable. The computer 300 includes one or more central processing units (CPUs) 302 and a storage 304. The storage 304 can be implemented with persistent storage devices, such as hard disk drives, optical drives, and so forth. The storage 304 can also include volatile memory, such as dynamic random access memories (DRAMs), static random access memories (SRAMs), and so forth.

The computer 300 includes a reservoir simulator 306, which is software executable on the CPU(s) 302 to perform the simulation at 217 in FIG. 2. In addition, a subterranean model update module 308 performs tasks 216, 230, 232, and 234 in FIG. 2. Also included in the computer 300 is a poro-elastic/resistivity modeling module (or modules) 310 to perform tasks 226 and 228 in FIG. 2. The subterranean model update module 308 and the poro-elastic/resistivity modeling module(s) 310 are also software modules executable on the CPU(s) 302.

The storage 304 contains various data structures, including observed data 312 (which corresponds to observed data 200, 202, and 204 in FIG. 2), and synthetic data 314 (which corresponds to synthetic data 210, 212, and 214 in FIG. 2). The storage 304 also contains subterranean models 316, which corresponds to subterranean models 220, 218, and 234 depicted in FIG. 2.

Instructions of software described above (including modules 306, 308, 310 of FIG. 3) are loaded for execution on a processor (such as one or more CPUs 302). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of updating a subterranean model, comprising:
   providing an initial subterranean model;

based at least in part on the initial subterranean model, predicting changes of subterranean parameters using a reservoir simulator, wherein predicting changes of the subterranean parameters comprises predicting changes due to development of a reservoir in a subterranean structure;

computing, by a computer, electromagnetic data representing characteristics of the subterranean structure according to the predicted changes of the subterranean parameters, wherein computing the electromagnetic data according to the predicted changes of the subterranean parameters comprises converting, using a rock physics model, the predicted changes of the subterranean structure to electrical properties associated with the subterranean structure, and computing the electromagnetic data from the electrical properties using electromagnetic modeling; and modifying the initial subterranean model to provide an updated subterranean model based at least in part on comparing the computed electromagnetic data with observed electromagnetic data.

2. The method of claim 1, further comprising:
computing seismic data representing characteristics of the subterranean structure according to the predicted changes of the subterranean parameters,
wherein modifying the initial subterranean model to provide the updated subterranean model is further based at least in part on comparing the computed seismic data with observed seismic data.

3. The method of claim 2, further comprising receiving the observed electromagnetic data and the observed seismic data, wherein the observed electromagnetic data is collected from a time-lapse electromagnetic survey, and the observed seismic data is collected from a time-lapse seismic survey.

4. The method of claim 2, further comprising converting, based at least in part on the rock physics model, the predicted changes of the subterranean parameters to:
(1) predicted changes of elastic properties associated with the subterranean structure, and
(2) predicted changes of the electrical properties associated with the subterranean structure.

5. The method of claim 1, wherein the predicted changes of the subterranean parameters are selected from the group consisting of predicted changes in pressure and predicted changes in saturation.

6. The method of claim 1, wherein converting the predicted changes of the subterranean parameters to the electrical properties comprises converting the predicted changes of the subterranean parameters to predicted changes of resistivity.

7. The method of claim 1, further comprising:
iteratively performing the providing, predicting, computing, and modifying tasks to provide a more accurate modified subterranean model, wherein in iteratively performing the tasks the updated subterranean model of a previous iteration of the providing, predicting, computing, and modifying tasks is used as the initial subterranean model of a current iteration of the providing, predicting, computing, and modifying tasks.

8. The method of claim 1, further comprising re-iterating the providing, predicting, computing, and modifying tasks for at least another subterranean model that is part of a group of subterranean models.

9. The method of claim 1, further comprising:
converting the predicted changes of the subterranean parameters to predicted changes of elastic properties associated with the subterranean structure;
computing seismic data representing characteristics of the subterranean structure according to the predicted changes of the elastic properties;
wherein modifying the initial subterranean model to provide the updated subterranean model is further based at least in part on comparing the computed seismic data with observed seismic data.

10. The method of claim 1, further comprising:
computing, using the initial subterranean model, one or more production profiles along a well,
wherein modifying the initial subterranean model to provide the updated subterranean model is further based at least in part on comparing the computed one or more production profiles to well production history containing observed measurement data.

11. The method of claim 1, wherein the electrical properties include resistivity properties, and wherein the electromagnetic data is computed based at least in part on the resistivity properties using the electromagnetic modeling.

12. An article comprising at least one computer-readable storage medium that contains instructions that when executed cause a computer to:
provide an initial subterranean model;
based at least in part on the initial subterranean model, predict changes to subterranean parameters of a subterranean structure due to development of a reservoir in the subterranean structure, and convert, using a rock physics model, the predicted changes to the subterranean parameters to predicted changes in electrical properties of the subterranean structure;
compute electromagnetic data using electromagnetic forward modeling based at least in part on the predicted changes to the electrical properties;
compare the computed electromagnetic data with observed electromagnetic data, wherein the observed electromagnetic data is collected using time-lapse electromagnetic surveying of the subterranean structure; and
modify the initial subterranean model to provide an updated subterranean model based at least in part on comparing the computed electromagnetic data with the observed electromagnetic data.

13. The article of claim 12, wherein the instructions when executed cause the computer to further:
predict, based at least in part on the initial subterranean model, changes to elastic properties of the subterranean structure due to the predicted changes of the subterranean parameters;
compute seismic data using seismic forward modeling based at least in part on the predicted changes to the elastic properties;
compare the computed seismic data with observed seismic data, wherein the observed seismic data is collected using time-lapse seismic surveying of the subterranean structure; and
wherein modifying the initial subterranean model to provide the updated subterranean model is further based at least in part on comparing the computed seismic data with the observed seismic data.

14. The article of claim 13, wherein the electrical properties include resistivity, and wherein the elastic properties include P-wave velocities, S-wave velocities, and densities.

15. The article of claim 12, wherein the instructions when executed cause the computer to further re-iterate the providing, predicting, converting, computing, comparing, and modifying tasks for at least another subterranean model.

16. The article of claim 12, wherein the instructions when executed cause the computer to further:

compute, using the initial subterranean model, one or more production profiles along a well, wherein modifying the initial subterranean model to provide the updated subterranean model is further based at least in part on comparing the computed one or more production profiles to well production history containing observed measurement data.

17. The article of claim 12, wherein the electrical properties include resistivity properties, and wherein the electromagnetic data is computed based at least in part on the predicted changes to the resistivity properties.

18. A computer comprising:

a storage to store observed seismic and observed electromagnetic data collected using time-lapse seismic and electromagnetic surveying, and to store an observed production history of a well, wherein the observed production history includes actual measurement data; and a processor to:

execute a reservoir simulator to produce an output based at least in part on a first subterranean model;

compute synthetic seismic data, electromagnetic data, and one or more production profiles along the well, based at least in part on the output of the reservoir simulator;

compare the synthetic seismic data to the observed seismic data;

compare the synthetic electromagnetic data to the observed electromagnetic data;

compare the computed one or more production profiles to the observed production history; and update the first subterranean model based at least in part on the comparing of the synthetic seismic data to the observed seismic data, the comparing of the synthetic electromagnetic data to the observed electromagnetic data, and the comparing of the computed one or more production profiles to the observed production history.

19. The computer of claim 18, wherein the executing, computing, comparing, and updating tasks are re-iterated until the comparing produces a match between the synthetic seismic data, synthetic electromagnetic data, and computed one or more production profiles, with the respective observed seismic data, observed electromagnetic data, and observed production history, within predefined one or more thresholds.

20. The computer of claim 18, wherein the synthetic seismic data is produced from the output of the reservoir simulator according to poro-elastic rock physics modeling and seismic forward modeling, and wherein the synthetic electromagnetic data is produced from the output of the reservoir simulator according to resistivity rock physics modeling and electromagnetic forward modeling.

21. The computer of claim 18, wherein the output of the reservoir simulator includes changes to subterranean parameters, and wherein the processor is configured to:

convert, using a rock physics model, the changes to the subterranean parameters to changes in subterranean electrical properties;

convert, using the rock physics model, the changes to the subterranean parameters to changes in subterranean elastic properties, wherein the synthetic seismic data is computed from the changes in the subterranean elastic properties using seismic forward modeling, and wherein the synthetic electromagnetic data is computed from the changes in the subterranean electrical properties using electromagnetic forward modeling.

* * * * *